United States Patent [19]
Takehara et al.

[11] Patent Number: 5,121,596
[45] Date of Patent: Jun. 16, 1992

[54] METHOD OF STARTING GAS TURBINE

[75] Inventors: Isao Takehara; Haruo Urushidani; Tetsuo Sasada; Hajime Toriya, all of Hitachi, Japan

[73] Assignee: Hitachi, Ltd., Tokyo, Japan

[21] Appl. No.: 446,317

[22] Filed: Dec. 5, 1989

[30] Foreign Application Priority Data

Dec. 9, 1988 [JP] Japan .................. 63-310033

[51] Int. Cl.$^5$ .............................................. F02C 7/26
[52] U.S. Cl. ...................... 60/39.05; 60/39.55; 60/39.141
[58] Field of Search ............ 60/39.05, 39.141, 39.3, 60/39.53, 39.55

[56] References Cited
U.S. PATENT DOCUMENTS 3,747,336  7/1973  Dibelius et al. .................. 60/39.3
4,969,324  11/1990  Woodson .......................... 60/39.05

FOREIGN PATENT DOCUMENTS 40238  3/1980  Japan ................................ 60/39.55
840624  7/1960  United Kingdom ............... 60/39.55

Primary Examiner—Louis J. Casaregola
Attorney, Agent, or Firm—Antonelli, Terry, Stout & Kraus

[57] ABSTRACT

A method of starting wherein the gas turbine, a gas turbine is started while injecting a prescribed amount of moisture into a combustor or a path for combustion gas from start up of the gas turbine, and the amount of moisture is varied in dependence upon the feed quantity of fuel or the temperature of the combustion gas so that combustion temperature in the combustor or temperature variation rate of the surfaces of component parts of the gas path is approximately constant.

8 Claims, 9 Drawing Sheets

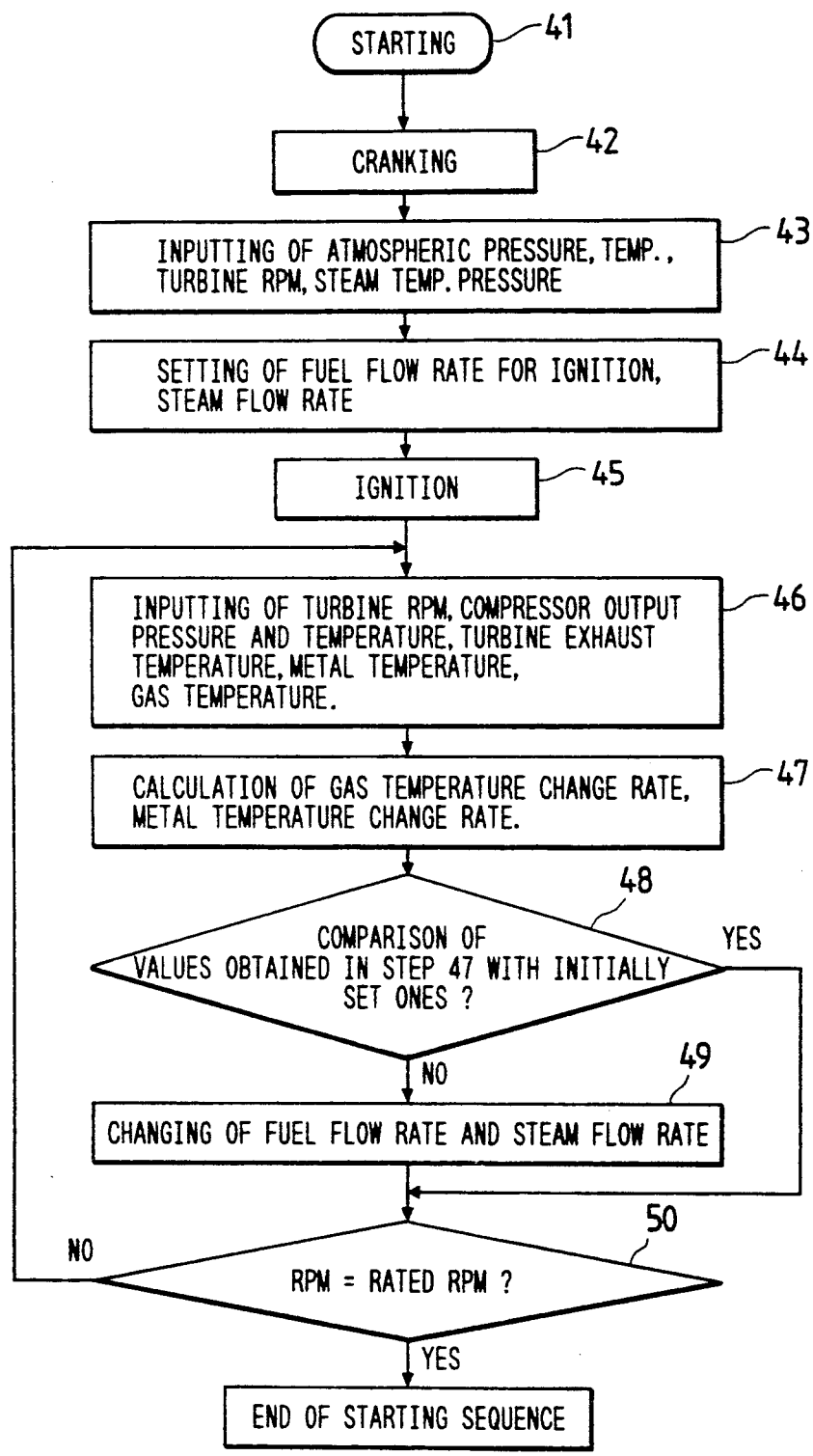

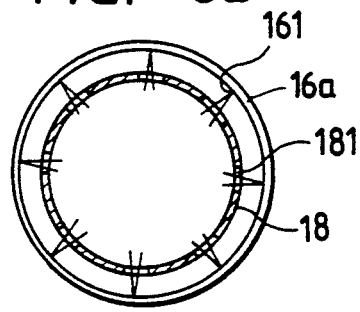
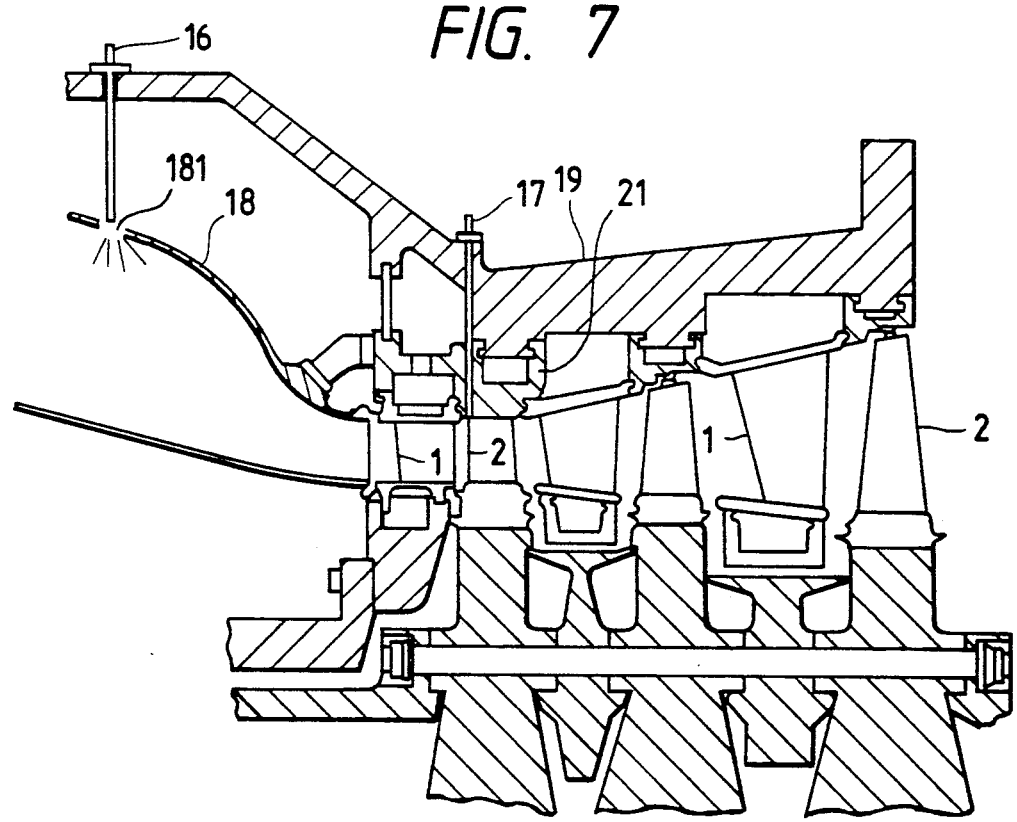

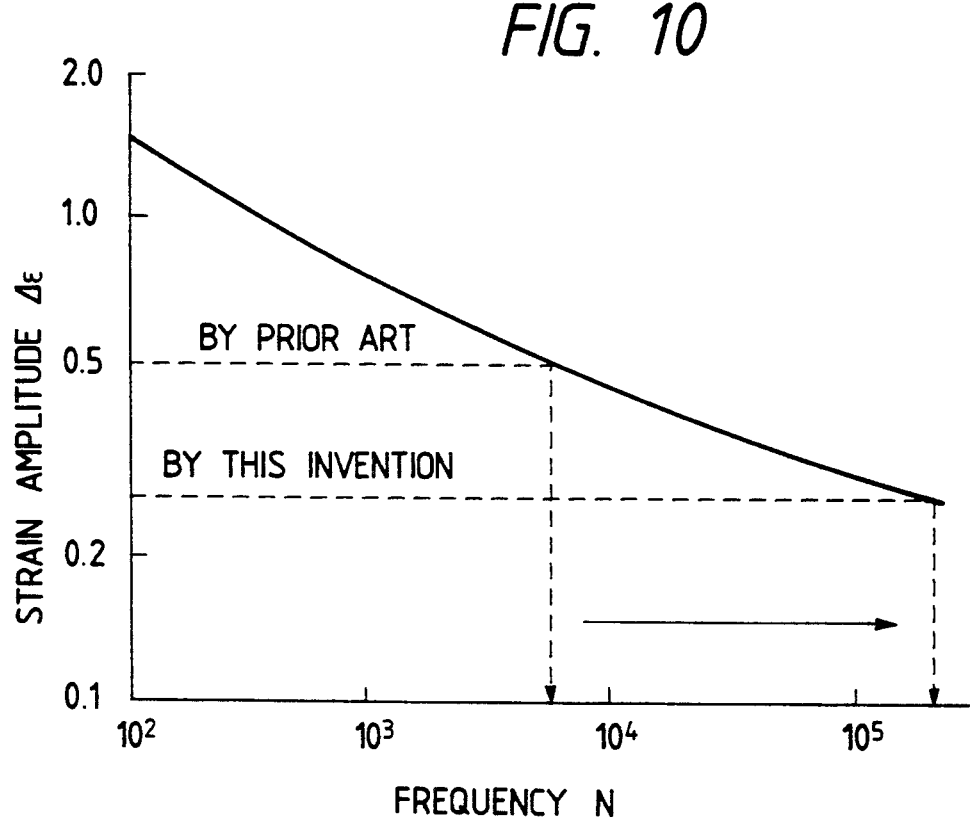

METHOD OF STARTING GAS TURBINE

BACKGROUND OF THE INVENTION

The present invention relates to a method of starting a gas turbine and, in particular, to a method in which an abrupt change in temperature of combustion gas at the time of starting the turbine is suppressed to reduce thermal stress and surface oxidation of component parts forming a path for the combustion gas so as to prolong the life of the component parts.

A method of starting a gas turbine has hitherto been generally employed to accelerate the turbine in such sequence that the turbine is warmed up using a cranking motor, a combustor is ignited at a certain flow rate of fuel injected thereinto, and the fuel flow rate is gradually increased.

At the time of ignition, since a fuel air ratio at that time is large, a gas temperature at the inlet of the turbine varies sharply, which causes the metal temperature of turbine structural members to sharply change.

Further, in general, stationary blades and moving blades are cooled with cooling medium introduced inside the blades, and the blades each have a large temperature difference between a leading edge and a trailing edge thereof and between an inside surface and outside surface thereof, so that thermal stresses are caused in most parts of each blade. Further, the temperature difference to lapse time becomes larger in the middle of turbine acceleration. Oxidation on surfaces of components forming a path for combustion gas is likely to be caused. The above-mentioned large thermal stresses and the surface oxidation reduce the life of the turbine.

A conventional method of warming up a gas turbine, wherein an exhaust gas temperature at the time of warming up is taken in as a control element and a fuel flow rate is controlled so that a gradient of the temperature will be within an allowed range thereof, is disclosed in Japanese Patent Laid-Open No. 55-114855/1980.

According to conventional method, the time period until the turbine reaches a rated rotational speed, that is, the starting time is prolonged.

SUMMARY OF THE INVENTION

An object of the present invention is to provide a gas turbine starting method in which the gas turbine is started with less thermal stresses caused in the gas turbine and with less surface oxidization in component parts forming a path for combustion gas without causing the turbine starting time length to increase.

The present invention resides in a method in which a gas turbine is started while injecting a prescribed amount of moisture into a combustor or a path for combustion gas from start up of the gas turbine, and the amount of moisture is varied depending on the feed quantity of fuel or the temperature of the combustion gas so that combustion temperature in the combustor or temperature variation rate of the surfaces of component parts of the gas path is approximately constant.

According to the gas turbine starting method of the present invention, the temperature at an outlet of the combustor or an inlet of the gas turbine can be largely reduced and the temperature variation rate can be kept almost constant by the quantity of moisture such as steam or water injected into the combustor or the component parts of the gas path of the turbine at the downstream side of the combustor, whereby abrupt temperature variation in the component parts of the gas path can be reduced at the time of starting the gas turbine.

In general, at the time of starting the gas turbine, metal temperature of, for example, an outer side of a cooled blade instantaneously reacts to the temperature variation of a gas and varies sharply, whereas, metal temperature of the inner peripheral side cooled with cooling air slowly varies against the gas temperature. Accordingly, the temperature difference between the outer and inner sides of the metal is large, but according to the present invention, variation rate of metal temperature on the outside of the cooled blade exposed to the gas at the start up is lowered by lowering the temperature variation rate of the gas on the outer side and thermal stress at the time of starting and surface oxidation can be reduced to a large extent by reducing the temperature difference between the outer and inner sides of the metal.

BRIEF DESCRIPTION OF THE DRAWINGS

FIGS. 4a and 4b each are a flow chart of performances conducted in a main processor;

FIGS. 5, 6a, 6b, 7, 8 and 9 each are a sectional view of the main parts of the gas turbine for explaining the gas turbine starting method of the present invention;

FIG. 10 is a diagram showing the life of the component parts of the gas path;

DETAILED DESCRIPTION OF THE INVENTION

Before detailing the features of the present invention, relationships between the fuel flow rate and the length of time for accelerating the turbine and between the flow rate and the temperature at the inlet of the turbine and metal temperature distribution will be described in detail, referring to FIGS. 2 and 3.

Figure 2:
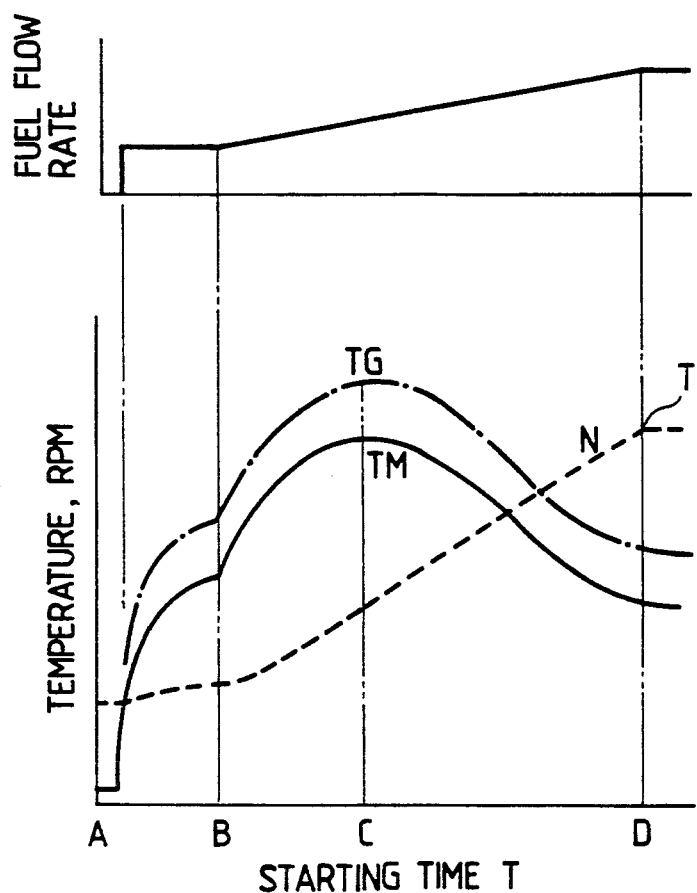
FIG. 2 is a diagram showing curves representing the relation between starting time and fuel flow rate, temperature of combustion gas and turbine rpm.

Referring to FIG. 2, fuel is ignited after injection into the combustor at a certain point of time (point A) when the turbine reaches a certain rotational speed (rpm) N after warming-up of the turbine. At the time of ignition, a large fuel-air ratio causes a gas temperature TG at the inlet of the turbine to sharply vary as can be understood from the drawing. The metal temperature TM of blades also sharply varies, of course.

The fuel flow rate is constant between the points A and B because of warming-up of the gas path of the turbine, however, it increases afterward, that is, the fuel flow rate increases at an almost constant rate between the points B and D when the turbine is accelerated and the rpm N thereof increases. At this time, a flow rate of air suctioned into the compressor which feeds air to the combustor varies on account of matching of the compressor with the turbine and the gas temperature TG sharply rises and falls as shown in the drawing. After the turbine reaches the rated rpm at a point (point T) beyond the range from the point B to point C within which the metal temperature of the component parts of the gas path including the blades rises acceleratedly and sharply, fuel in quantity sufficient for maintaining the rpm of the turbine is injected.

Figure 3:
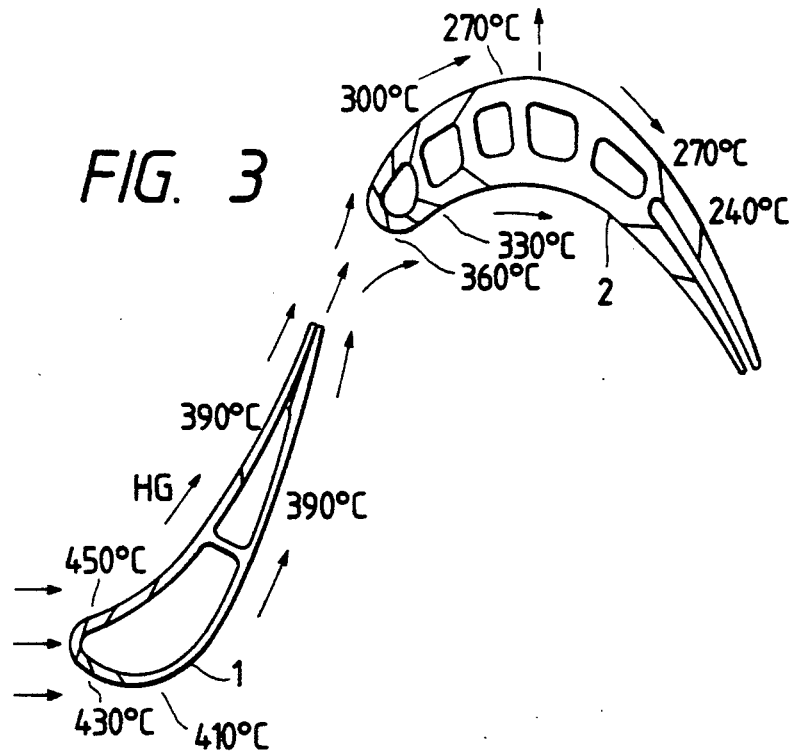
FIG. 3 is a sectional view of stationary and moving blades showing metal temperature distribution on the blades at the time of starting.

Referring to FIG. 3 showing respective sections of a stationary blade 1 and a moving blade 2, high temperature gas HG accelerated by the stationary blade 1 flows toward the moving blade 2 and impact of gas at this instance drives the moving blade 2 in the direction of a broken line arrow. Generally, the stationary blade 1 and moving blade 2 of the gas turbine are cooled from inside so that the material strength thereof is not lowered and, therefore, the temperature difference between the leading and trailing edges of blades reaches 60° to 80° C. The temperature difference between the outside and inside surfaces of the blade also increases. Thus, thermal stress occurs at almost all parts of the blade and, during acceleration, the temperature difference becomes larger, leads to abnormally high thermal stress, and tends to cause surface oxidation of the component parts of the gas path.

A gradual increase in quantity of fuel to be injected into the combustor, that is, a gradual increase of rpm of the turbine as a countermeasure to the above problems serves to reduce stress of the component parts of the gas path to some extent, of course, however, is likely to increase the length of time for starting the turbine. The present invention is made to solve the above-mentioned problems.

Figure 1:
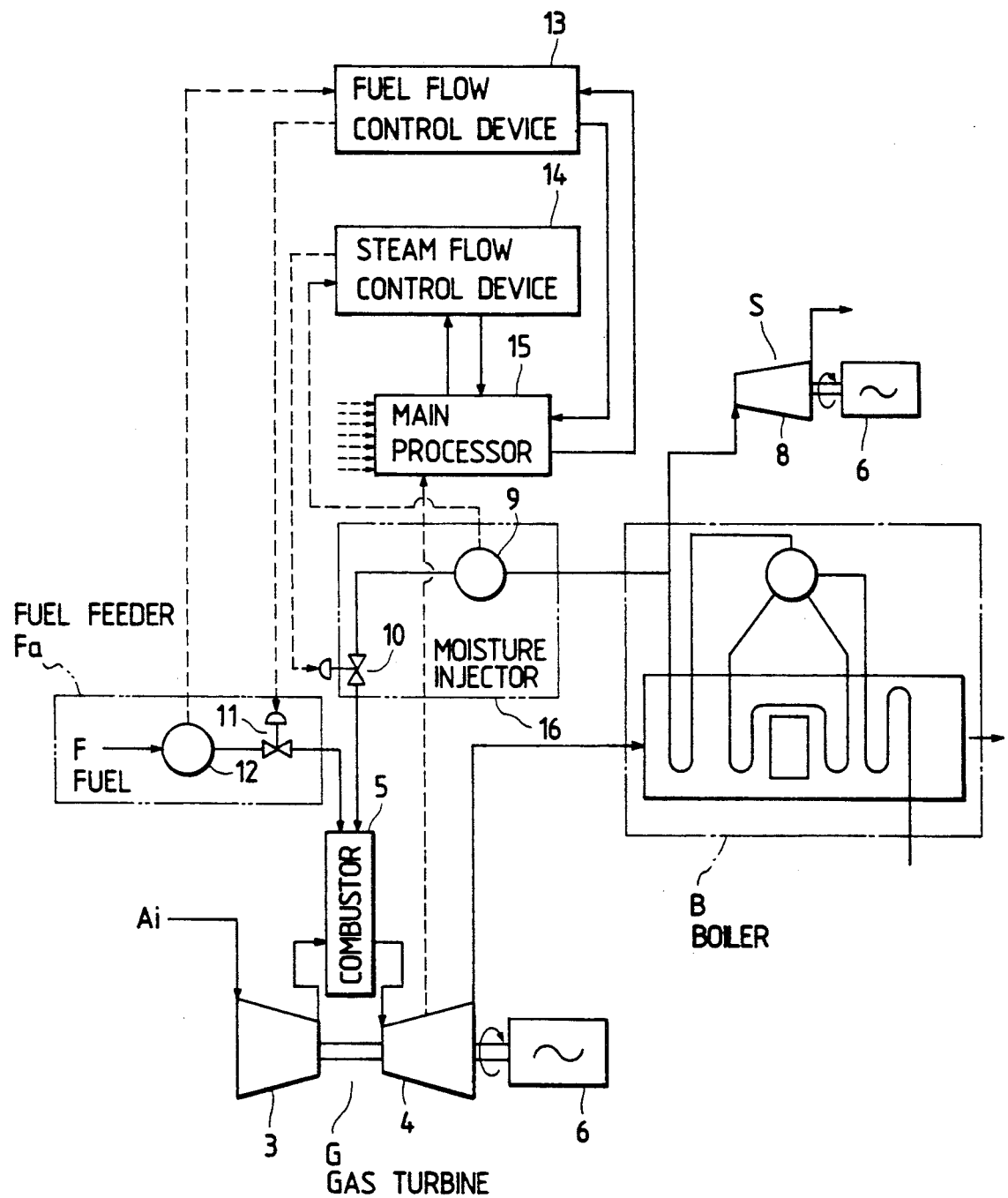
FIG. 1 is a diagram of a control system for explaining an embodiment of a method of starting a gas turbine according to the present invention.

As shown in FIG. 1 a power plant system comprises a gas turbine system G, steam turbine system S, and an exhaust heat recovery boiler B.

The gas turbine system or gas turbine G comprises a compressor 3, a gas turbine 4, a combustor 5 and an electric power generator 6. In this gas turbine system G, air Ai is suction into the compressor 3, compressed to a high pressure, and introduced into the combustor 5. The air is used for combustion of fuel F fed from a fuel feeder $F_a$ and high temperature gas is produced thereby. The high temperature gas, that is, combustion gas then flows into the gas turbine 4 and drives a turbine rotor thereof. Driving power obtained from the turbine drives the electric power generator 6.

Signals of pressure and temperature in discharge gas of the compressor, temperature of exhausted gas from the gas turbine and rpm of the gas turbine are inputted into a main processor 15. Signals from a fuel flow meter 12 are inputted into a fuel flow control device 13, subjected to a prescribed processing in the main processor 15, and returned to the fuel flow control device 13 to determine a degree of opening of a flow control valve 11.

The exhaust heat recovery boiler B is disposed at the downstream side of the gas turbine 4 and, when the gas turbine is used in a combined plant, a steam turbine 8 is disposed downstream of the exhaust heat recovery boiler B.

When starting the gas turbine 4, atmospheric temperature and pressure, a metal temperature in the turbine prior to starting, and pressure and temperature of steam to be fed into the turbine at the time of starting are detected so that a fuel flow rate and steam quantity to be fed at the time of starting are determined in the main processor 15 and signals of the determined fuel flow rate and the steam quantity are inputted into the fuel flow control device 13 and steam flow control device 14. The fuel flow control device 13 and steam flow control device 14 set degrees of opening of the fuel flow control valve 11 and steam flow control valve 10, respectively, for emitting signals thereof. The fuel flow meter 12 and steam flow meter 9 each measure a flow rate, whereby whether respective flow rates are as fixed or not is detected and the measured values are fed back to respective control devices 13, 14. On the other hand, injected steam is introduced from the exhaust heat-recovery boiler B or other sections in the plant and fed into a downstream side of the turbine combustor 5. Flow rates of fuel and steam are instantaneously judged and changed by the main processor 15 and feedback circuit so as to correspond to gas temperature and metal temperature instantaneously changing at the time of starting of the turbine, whereby an abrupt temperature change of component parts forming the gas path at the time of starting is not caused.

Figure 4A:
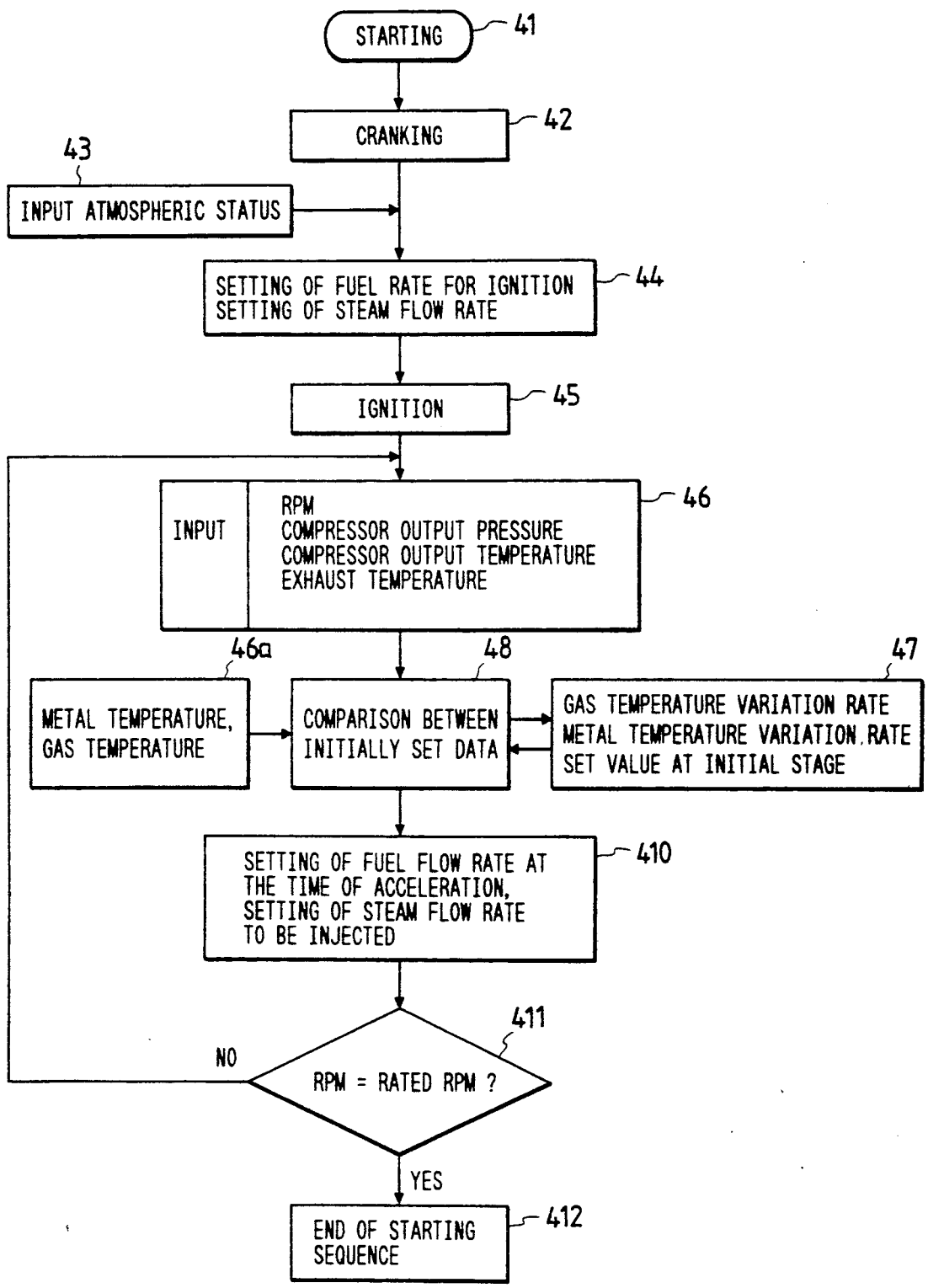

FIG. 4a is an example of a flow chart of processing conducted by the main processor which sets the fuel quantity and steam quantity at the time of turbine starting. A starting motor or engine is excited with starting signals in a step and inputs signals for cranking. The turbine 4 is cranked in step 42. During cranking, fuel flow rate to be ignited and steam flow rate to be fed after ignition are set in step 44 according to signals of atmospheric temperature and pressure inputted in step 43, rpm, steam temperature and pressure, and ignition is carried out in step 45. After the lapse of $\Delta_{Time}-1 \approx 2$ sec subsequent to the ignition, signals from various kinds of detectors are inputted into the main processor in steps 46 and 46a, whereby a metal temperature rise rate ($\Delta Tm/\Delta t$) fuel flow rate ($\Delta F_u/\Delta t$) and steam flow rate are compared with variation rates set for reducing thermal stress by a certain extent, for a turbine rpm increase rate ($\Delta N/\Delta t$), in steps 47 and 48 and they are set for turbine acceleration in step 410. When the metal temperature $T_m$ or variation rate of gas temperature $T_g$ at the combustor outlet is large, the fuel flow quantity is reduced to a degree required for producing turbine accelerating torque and steam flow quantity is increased. When variation rates of the metal temperature $T_m$ and gas temperature $T_g$ at the combustor outlet are smaller than set values, after judging whether or not the measured values are sufficient for obtaining accelerating torque, fuel flow quantity or steam flow quantity are increased when needed. The above control is effected until the turbine reaches a rated rpm, and when the rated rpm is reached. The turbine starting sequence is completed in step 412.

FIG. 4b is another example of a flow chart of processing conducted by the main processor 15 which sets the fuel flow rate and steam flow rate at the time of turbine starting. In step 41, a starting signal is outputted. A start up motor or a start up engine is excited with the starting signal to crank in step 42. During cranking, fuel flow rate for ignition and steam flow rate to be fed after ignition are set in step 44 according to signals of atmospheric temperature and pressure, rpm, steam temperature and pressure emitted from detectors, which are inputted at step 43. After the lapse of time $\Delta T_i-1 \approx 2$ sec subsequent to ignition caused by ignition signals in step 45, signals from various kinds of detectors, that is, the turbine rpm, compressor output pressure and temperature, turbine exhaust temperature, metal temperature and gas temperature are inputted into the main processor 15, in step 46 and a metal temperature rise rate ($\Delta T_m/\Delta t$) and gas temperature rise rate ($\Delta T_g/\Delta t$) are calculated for turbine rpm increase rate in step 47. The calculated data are compared with values which are set for reducing thermal stress to prescribed one in step 48. When the metal temperature $T_m$ or variation rate of gas temperature $T_g$ at the combustor outlet is large, the fuel flow rate is reduced to a degree required for producing turbine accelerating torque and steam flow rate is increased in step 49. When variation rates of the metal temperature $T_m$ and gas temperature $T_g$ at the combustor outlet are smaller than set values, after judging whether or not the measured values are sufficient for obtaining accelerating torque, fuel flow rate or steam flow rate are increased when needed, in step 49. The above control succeeds until the turbine rpm reaches to a rated one in step 50. In this way, starting of the turbine is made possible without changing the time of starting in wide range and at the gas temperature and metal temperature variation rates reducing thermal stress of component parts of the gas path.

Figure 5:
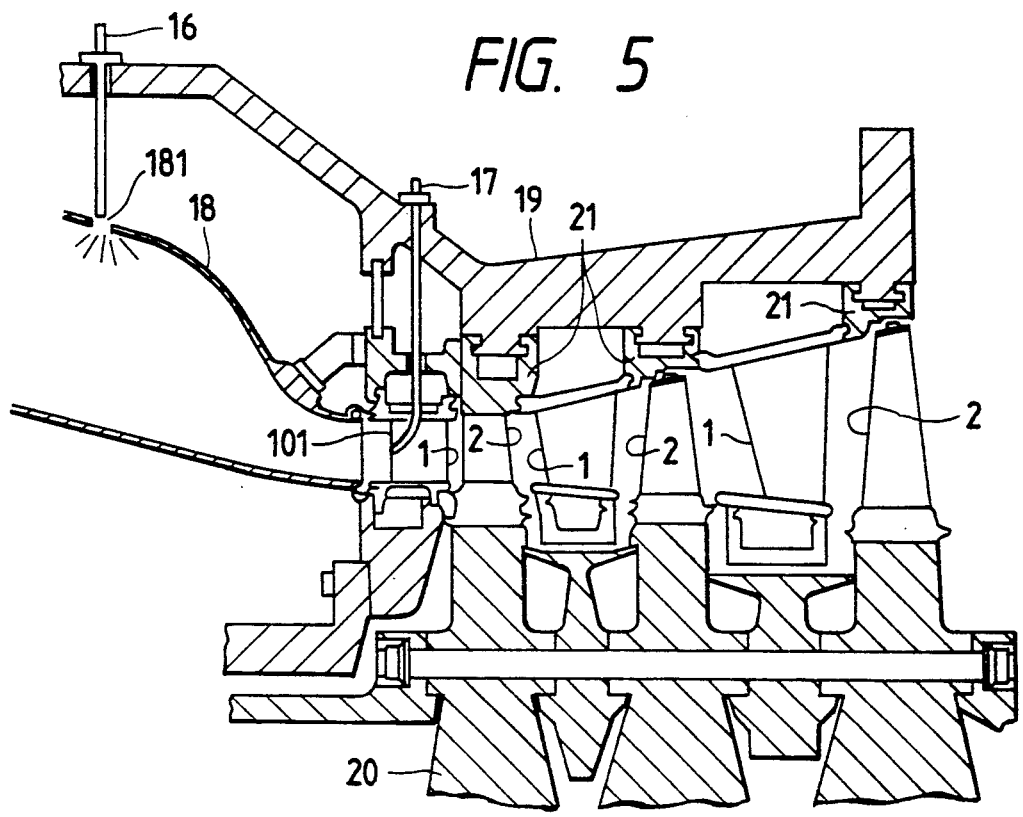

In FIG. 5 showing a position for feeding steam in the gas turbine and that for measuring the metal temperature, the turbine 4 is disposed downstream of the combustor 5 and has stationary blades 1 fixed inside the casing 19 of the turbine through shrouds 21 and moving blades 2 disposed between the stationary blades 1. The moving blades 2 are secured to the turbine disk 20. Energy of the main flow gas of high temperature and high speed accelerated by the stationary blades 1 is converted into torque for driving the turbine. The torque is transmitted to the side of the electric power generator 6 through the disk 20. Steam to be fed to the gas turbine system depending on the method of the present invention at the time of starting is fed from a steam feeder (moisture injector) 16 positioned at the entrance of a transition piece 18 of the combustor 5 through a hole 181 and it is important that flame is prevented from failing. For averting abrupt change of temperature of combustion gas at the time of starting from acting on the transition piece 18 and causing thermal stress, steam is fed at the entrance of the transition piece 18 to lower the gas temperature and to reduce thermal stress in the component parts of gas path in the gas turbine 4 disposed downstream of the transition piece 18. A thermocouple 17 for detecting the metal temperature of the primary stationary blade 1 exerting the strongest influence upon the life of parts through thermal stress caused at the starting time is fixed to the leading edge 101 of the primary stationary blade 1 and steam is fed from the steam feeder 16 at the time of starting in order that the metal temperature variation rate of the primary stationary blade 1 and at the time of starting may be equal to the variation rate set as described above for reducing thermal stress.

Figure 6A:
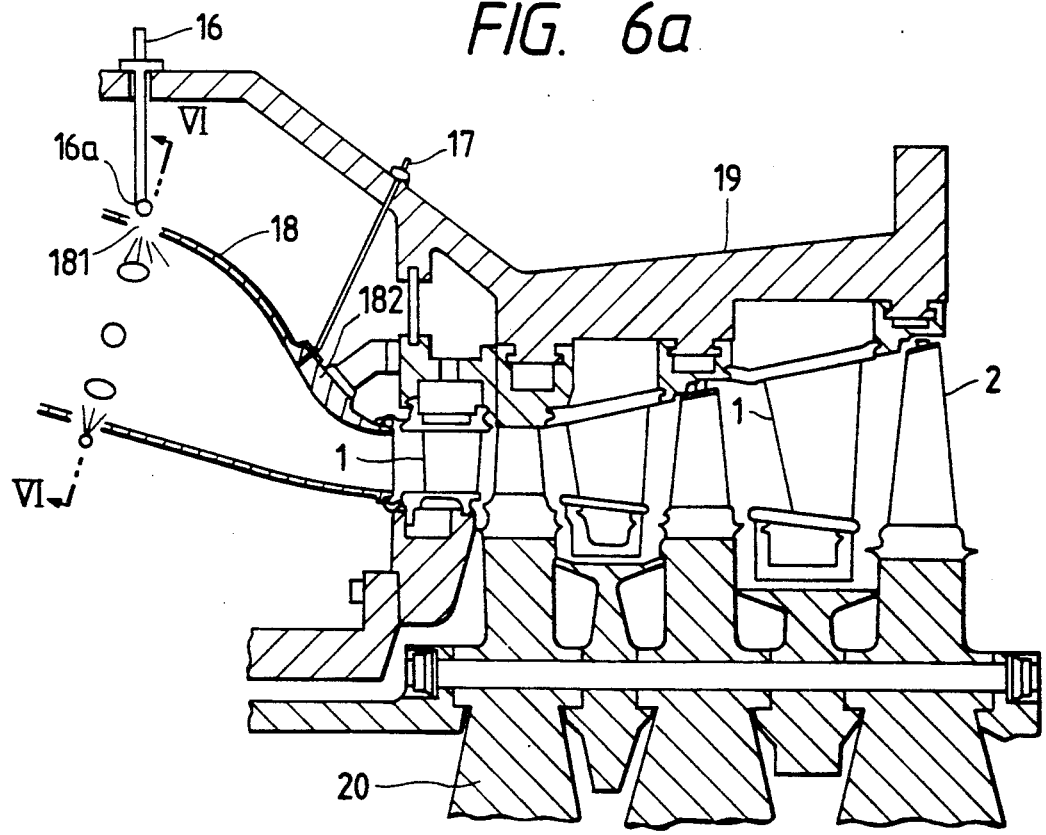

FIG. 6a is another embodiment in which, although a longitudinal position for injecting steam into the gas turbine system is the same as that shown in FIG. 5, a steam injection pipe 16a is arranged around the entire outer periphery of the transition piece 18 of the combustor for injecting steam from the circumference of the transition piece 18 through holes 161 formed in the injection pipe 16a and holes 181 formed in the transition piece, as shown in FIG. 6b. A position for measuring the metal temperature is so set as to measure the metal temperature of the portion near a mount base 182 on which thermal stress of the transition piece 18 of the combustion tends to act most severely, and the position is one most sensitive to the temperature variation of gas.

FIG. 7 is a view of still another embodiment, in which a position for injecting steam into the gas turbine system is the same as that shown in FIG. 5 and a position for measuring the metal temperature of the component parts of the gas path is so set as to detect the metal temperature of the primary moving blade 2 which is a rotating body always sustaining centrifugal stress and most susceptible to thermal load, in other words, causes high thermal stress at the time of starting. A thermocouple or metal temperature measuring optical thermometer is fixed to the shroud 21 so as to face outer front periphery of the moving blade 2 for measuring the temperature of gas or the metal at the moving blade in rotation or the inlet thereof. Signals corresponding to the detected temperature are transmitted to the main processor 15 in FIG. 1, a steam flow rate at the time of starting is set so that the measured degree of temperature varies at a fixed rate against the metal temperature variation rate of the moving blade at the time of starting.

Figure 8:
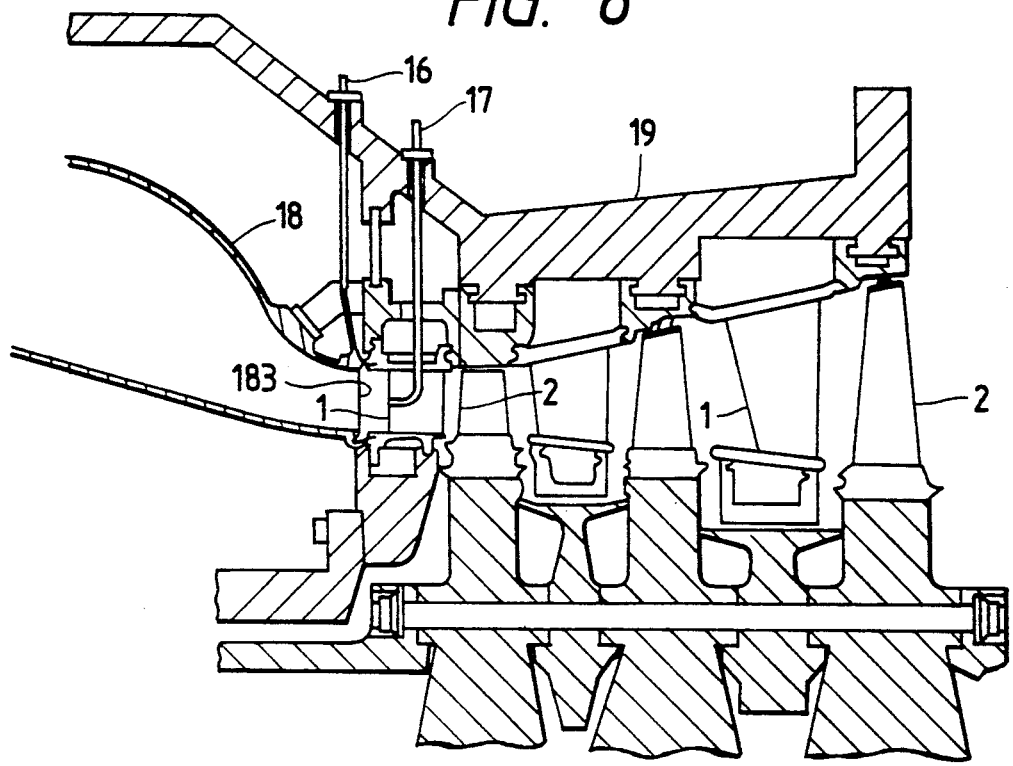

FIG. 8 is a view of further embodiment in which a position for injecting steam is set at the inlet of the primary moving blade 1, namely, the outlet part 183 of the transition piece 18 and, thereby, the metal temperature variation in the component parts of the gas path at the time of starting is reduced.

Figure 9:
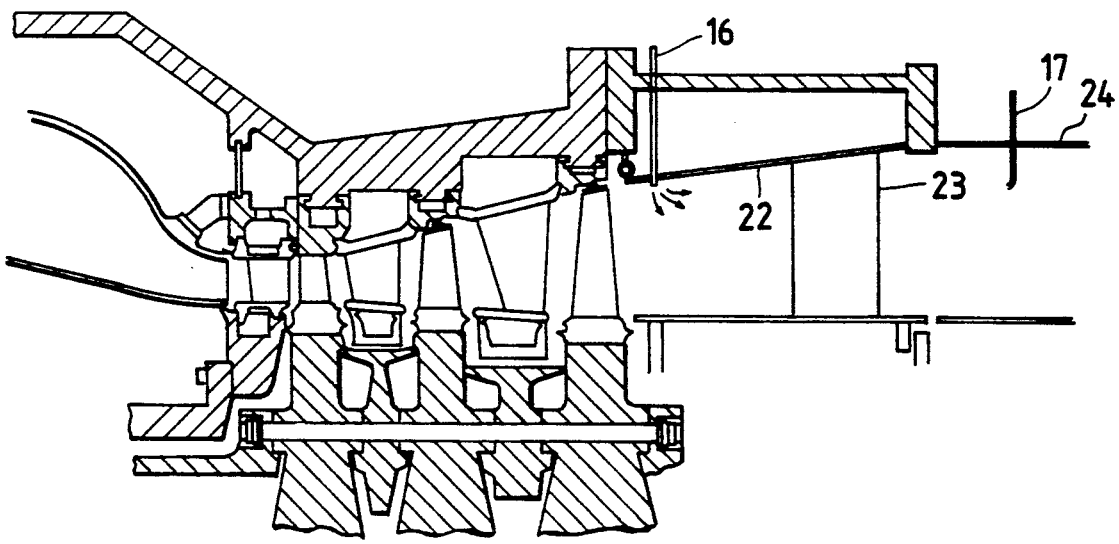

FIG. 9 shows a still further embodiment, in which a large quantity of steam is flowed into the outlet part of the turbine 4 for reducing thermal stress of the inner wall of the boiler caused by sharp variation of the discharged gas temperature when starting the gas turbine of the exhaust heat recovery boiler 7 (see FIG. 1) positioned downstream of the gas turbine 4 used in the combined plant, whereby the service life of the boiler is prolonged further. In this embodiment, the steam injector 16 is provided for injecting steam in an exhaust gas hood cylinder 22 supported by struts 23, and the temperature detector 17 is disposed in a diffuser 24.

The temperature detector 17 described above is desirably covered with heat-corrosion-resistant alloy and the detector 17 is easier to replace from the outside of the gas turbine system.

Figure 11A:
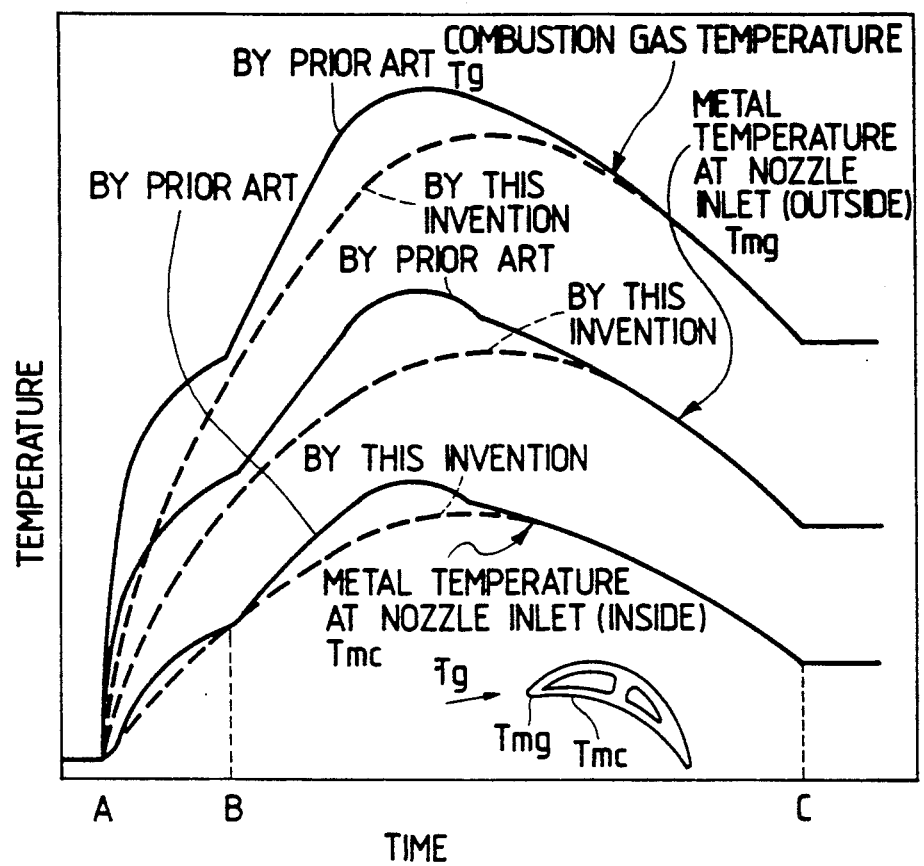
FIG. 11a is a diagram showing curves representing the relation between the starting time and temperature of every part.
Figure 11B:
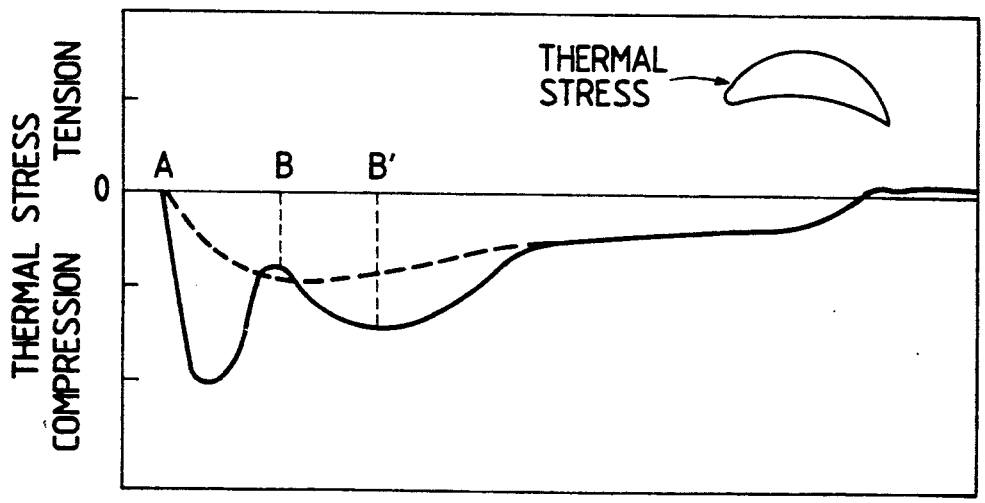
FIG. 11b is a diagram showing curves indicating the relation between the starting time and variation in thermal stress.

FIGS. 11a and 11b are graphs showing variation in gas temperature $T_g$ at the inlet of the primary stationary blade 1, the metal temperature variation on the side of gas at the inlet (outside) of the primary stationary blade 1 and on the cooling air side (inside), and one example of variation in thermal stress at the time of starting with respect to the time of starting. As shown by the solid line (prior art) in the drawings, the metal temperature on the side of gas (outside at the nozzle inlet side) quickly reacts to temperature variation of the combustion gas at the time of starting, whereas, that on the side of the cooling air (inside at the nozzle inlet side) does not follow the combustion gas temperature variation, whereby a large difference of metal temperature is caused between the ignition point A and the acceleration point B and the metal temperature variation rate with respect to the time period is large, which produce the maximum values of compression stress exceeding 40 kg/mm² in the direction of span at the point A and that B' as an important factor for governing the life of the blade relative to the frequency of starting the turbine as shown by the solid line in FIGS. 11a and 11b. Variation in combustion gas temperature and metal temperature on the respective sides of gas at the primary stationary blade, and cooling air when starting the turbine while depending on the method of the present invention is shown by the broken line in the drawing. When executing starting according to the method of the invention, since injection of steam at the time of starting enables such control as to prevent temperature of gas at the inlet of the stationary blade from sharply varying at the points A and B at the time of ignition and acceleration, respectively, the thermal stress generated at this time at the inlet of the stationary blade is approximately halved as compared with that generated without injection of steam at the time of starting, thereby apparently proving that the thermal stress can be largely reduced. A quantity of steam or water to be injected is set in dependence upon calculation, however, can be set more accurately when testing is performed beforehand for confirmation.

FIG. 10 is a view showing the frequency N of starting until occurrence of breakdown against amplitude of strain exerted on the cooling blade as the major one of the component parts of the gas path at the time of starting. When depending on the prior art, the frequency to start the gas turbine until breakdown is $10^4$ or so. In contrast with the above, when employing the method of the invention, the amplitude of strain caused in the cooling blade at the time of starting is lowered to an approximate half of the conventional one and the frequency of starting until breakdown increases to ten times or more that in the prior art, thereby enabling prolongation of the life of the turbine to a large extent.

As has been described, a method according to the present invention, in which the gas turbine is started and accelerated while a certain fixed quantity of moisture is injected into the gas path at the beginning of starting and the quantity of moisture is varied as a function of the feed quantity of fuel or the temperature of combustion gas, so that the combustion temperature in the combustor or temperature variation of the surface of the component parts of the gas path may be constant, thermal stress caused in the parts of the gas path at the time of starting can sufficiently be reduced, sharp variation in temperature on the surfaces of the parts of the gas path is not caused, and the surface temperature itself can be controlled to be low, thereby oxidation of the surfaces of the parts of the gas path can be prevented and the life of the parts can be prolonged to a large extent.

What is claimed is:

1. A method of starting a gas turbine system having a turbine to be driven with combustion gas, a combustor to feed combustion gas to said turbine, a fuel feeder to feed fuel into said combustor, and a moisture injector to inject moisture into a path of combustion gas, the method comprising the steps of:

injection moisture form said moisture injector into said path of combustion gas at the time of starting and during acceleration of the turbine, and controlling a quantity of moisture to be injected by the moisture injector so that a temperature rise rate of component parts forming the combustion gas path is approximately constant.

2. A method of starting a gas turbine as set forth in claim 1, wherein the moisture injector is positioned such that the moisture is injected at a combustion gas outlet part of said combustor.

3. A method for starting a gas turbine as set forth in claim 1, wherein the beginning of the step of injecting moisture corresponds to a starting time of accelerating the turbine.

4. A method of starting a gas turbine provided with a combustor, a fuel feeder to feed fuel into said combustor, a moisture injector disposed in the flow path of combustion gas combusted in said combustor and adapted to inject moisture into the component parts of the gas path and said combustion gas, the method comprising the steps of:

injecting the moisture into the component parts of the gas path and said combustion gas, and controlling a quantity of moisture to be injected by said moisture injector when the turbine is started so that a surface temperature variation rate of said component parts of the gas path is approximately constant.

5. A method of starting a gas turbine including a compressor and a combustor, the method comprising the steps of:

cranking the turbine to rotate;

feeding fuel to the combustor and igniting fuel in the combustor to thereby drive the turbine with combustion gas from the combustor; and injecting steam into a gas path of the gas turbine and controlling a quantity of steam to be injected so that a temperature rise rate of component parts formed in the gas path is approximately constant.

6. A method of starting a gas turbine according to claim 5, further comprising the steps of:

changing a flow rate of the fuel fed to the combustor in accordance with acceleration of the turbine, and controlling a flow rate of steam to be injected so that a metal temperature rise rate of a turbine blade forming a part of the exhaust gas path is maintained at a predetermined value.

7. A method of starting a gas turbine according to claim 6, wherein the steam is injected during the step of injecting into a transition piece of the combustor during a period of time between a time of ignition and a time the turbine reaches to a rated rotational speed.

8. A method of starting a gas turbine according to claim 7, wherein the steam is injected during the step of injecting from a plurality of holes formed in a side wall of the transition piece of the combustor.

* * * * *